UNITED STATES PATENT OFFICE.

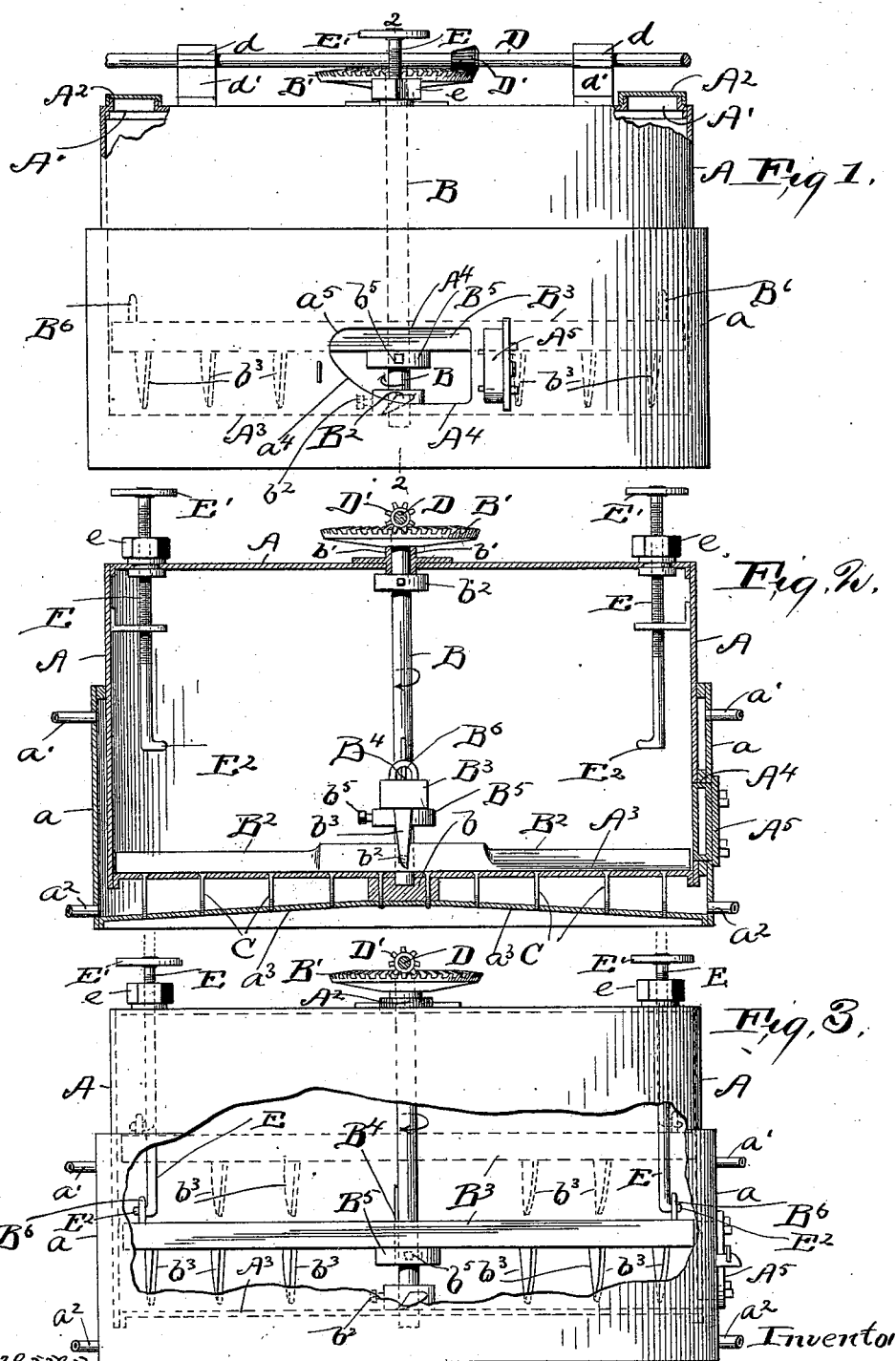

CHARLES E. ORD, OF SOUTH BROOKLYN, OHIO.

DRIER.

SPECIFICATION forming part of Letters Patent No. 568,696, dated September 29, 1896.

Application filed March 14, 1896. Serial No. 583,207. (No model.)

*To all whom it may concern:*

Be it known that I, CHARLES E. ORD, of South Brooklyn, Cuyahoga county, Ohio, have invented certain new and useful Improvements in Driers; and I do hereby declare the following to be a full, clear, and exact description of the invention, such as will enable others skilled in the art to which it pertains to make and use the same.
My invention relates to an improved drier especially well adapted for use in the manufacture of fertilizers, and comprising a tank into which the material to be dried is introduced, and that is provided internally with rotary agitating or mixing arms or breakers, instrumental in breaking up or disintegrating or stirring and mixing the material under treatment, and, furthermore, instrumental in discharging the dried or treated material through a doorway or opening formed within the lower portion of a side of the tank.

The invention consists, primarily, in a discharge door or opening having such shape as to prevent an obstruction or impediment to the revolving discharging blades or arms as the latter move past said opening.

The invention consists, furthermore, in vertically-adjustable agitating or stirring or disintegrating arms, and means for elevating said arms out of the material being treated and retaining them at the desired elevation out of operative connection with the operating-shaft.

My invention consists, moreover, in certain features of construction and combinations of parts hereinafter described, and pointed out in the claims.

In the accompanying drawings, Figure 1 is a side elevation, partly in vertical section, of a drier embodying my invention. This figure shows the discharging side of the machine. Fig. 2 is a side elevation, mostly in central vertical section, on line 2 2, Fig. 1. Fig. 3 is a side elevation corresponding with Fig. 2, except that in Fig. 3 the revolving toothed arms or bars are shown in position engaged by the screws employed in elevating said bars or arms out of the material under treatment, and said Fig. 3 shows said arms or bars thus elevated in dotted lines. Portions of the tank and surrounding steam-jacket of the machine are of course broken away in Fig. 3 to more clearly show the construction.

My improved drier comprises an upright cylindrical tank A, into which the material to be dried is introduced at any suitable number of charging-holes $A'$ with which the top of said tank is provided. $A^2$ designates the covers for closing said openings $A'$. The material to be dried is treated in the lower portion of the tank, and said tank portion is surrounded by a steam-chamber or steam-jacket $a$, constructed in any approved manner and provided, at or near its upper end, with any suitable number of steam-supply pipes $a'$, communicating with the steam-chamber. The steam-jacket extends, preferably, a suitable distance below the bottom $A^3$ of tank A, and the bottom $a^3$ of the steam-chamber or steam-jacket declines, preferably, from the central portion of said jacket below the central portion of tank A downwardly and outwardly toward the surrounding side walls of the steam-chamber. The steam-jacket, at the lower end of said bottom, is provided with any suitable number of drain-pipes $a^2$, communicating with the jacket's chamber and employed in carrying off any water resulting from condensation of steam within said chamber.

Tank A, at one side and a short distance above its bottom $A^3$, is provided with a discharging doorway or opening $A^4$, at which the material treated in said tank is discharged. The surrounding casing of said doorway or opening extends through the steam-jacket and cuts off communication between said doorway or opening and the jacket's chamber. $A^5$ designates a suitably-applied door for closing opening $A^4$. Door $A^5$ is shown open in Fig. 1, and closed in Figs. 2 and 3.

The jacket's bottom and tank's bottom are preferably connected together and braced apart by means of suitably-applied stay-bolts or rods C, as shown in Fig. 2.

An upright shaft B extends centrally through tank A, and at its lower end has bearing in a step-box $b$, suitably formed or constructed between the bottoms of the tank and surrounding jacket. Said shaft B, at or near its upper end, has bearing in a box $b'$, that is suitably secured to the top of tank A.

A collar $b^2$, mounted upon and rigidly secured to the shaft and abutting the lower end of said box $b'$, prevents upward displacement of the shaft. A bevel-gear $B'$ is operatively mounted upon the upper end of said shaft above box $b'$, and meshes with a pinion $D'$, operatively mounted upon the suitably-driven horizontally-arranged driving-shaft $D$, that has bearing in any suitable number of boxes $d$, formed upon the upper ends of standards $d'$, that are rigidly secured to the top of tank $A$. Shaft $B$, at its lower end, is provided with any suitable number of laterally-projecting arms or blades $B^2$, arranged at right angles to the shaft and in exceedingly close proximity to the tank's bottom and extending into close proximity to the surrounding wall of the chamber of the tank. Two blades or arms $B^2$ are shown in the machine, illustrated at opposite sides, respectively, of the shaft. Arms or blades $B^2$ are not only instrumental in preventing the material being treated from baking upon or adhering to the tank's bottom, but also find employment in breaking up, stirring, and mixing material, and are employed also in effecting the discharge of the treated material from the machine through opening $A^4$. Members $B^2$ are preferably integral with each other and adjustable vertically relative to the tank's bottom and secured in the desired adjustment by a set-screw $b^2$. Shaft $B$, at a suitable elevation above arms or blades $B^2$, is provided with any suitable number of laterally-extending arms $B^3$, that extend into close proximity to the surrounding wall of the chamber of the tank and are arranged at right angles to the shaft and out of line with blades or arms $B^2$.

The machine illustrated is provided with two arms $B^3$, arranged at opposite sides, respectively, of the shaft and at right angles to arms or blades $B^2$, and the two arms $B^3$ are shown integral with each other and operatively mounted upon the shaft by a groove and feather at $B^4$. The feather is formed upon the shaft and the groove extends through one of the arms, so as to accommodate a vertical adjustment of the downwardly-projecting teeth $b^3$ with which arms $B^3$ are provided relative to the bottom of the tank. Each bar $B^3$ is provided, preferably, with several teeth $b^3$, arranged at suitable intervals lengthwise of the bar.

The toothed bars or arms may not only be used in effecting the discharge of the material from the machine, but find employment in stirring and mixing the material under treatment and in breaking up or disintegrating the upper surface of the material. Said arms or bars rest upon a collar $B^5$, that is adjustable vertically of the shaft, and is secured to the shaft in the desired adjustment by means of a set-screw $b^5$. The vertical adjustability of said collar $B^5$ is necessary to accommodate a vertical adjustment of the said bars or arms. The toothed arms or bars $B^3$ are elevated, if desired, out of the material and out of operative connection with shaft $B$. Bars $B^3$ are elevated by means of upright screws $E$, that extend through upright nuts $e$, suitably secured to the top of tank $A$, and each screw $E$ at its upper end is provided with a hand-wheel $E'$ for turning the same. Two screws $E$ are shown provided in the machine illustrated at diametrically opposite points, respectively, and it is obvious that the screws are lowered or elevated according as they are turned in the one direction or the other. Each screw at its lower end is provided with a laterally-projecting arm $E^2$, adapted upon lowering the screw to the extent required to engage an eye $B^6$, secured to or formed upon the outer end of each bar or arm $B^3$. In Fig. 3 the screws are shown lowered, with their arms $E^2$ in engagement with the eyes upon arms or bars $B^3$, and in dotted lines in same figure said bars are shown elevated above the feather formed upon the shaft and consequently out of operative connection with the shaft.

Arms or blades $B^2$ are arranged, preferably, obliquely to the tank's bottom, as shown in Figs. 1 and 3, to facilitate the discharge of the treated material from the tank through opening $A^4$. Blades or arms $B^2$ extend above and below the lower extremity of the discharge-opening, and preferably about an inch below said opening, to avoid wedging or clogging of the material between said arms or blades and the opening's lower wall during the discharging operation, and thereby avoid breakage or mutilation of any of the operating parts of the machine. The arrows indicate the direction in which shaft $B$ and its arms move during the machine's operation, and the end of opening $B^4$, in the direction of which said arms move during their operation, I term the "forward" end of the opening. To avoid clogging of the material in and adjacent to the forward end of said opening, and to avoid an obstruction and possibly breakage or mutilation of the operating parts of the machine, I avoid the employment of anything approximating a square corner at the forward end of said opening and form an incline $a^4$, forming the forward portion of the lower wall and lower portion of the forward end wall of said opening, and having its trend upwardly in the direction in which members $B^2$ revolve, so that any material that would otherwise tend to clog at the forward end of said opening, and thereby obstruct the operation of the machine during the discharge of the material, is caused to rise up said incline out of the way, and for the same reason I preferably have the forward end wall of said opening curve or slope inwardly at its upper end, as at $a^5$, as shown in Fig. 1.

What I claim is—

1. A machine of the character indicated having its tank provided, internally with suitably-actuated revolving members for effecting the discharge of the treated material, and having, in one of its sides, a discharge-opening whose lower wall's forward portion and whose forward end wall's lower portion form an incline having a trend forwardly and upwardly in the direction in which the aforesaid revolving members within the tank revolve, substantially as and for the purpose set forth.

2. A machine of the character indicated having its tank provided internally with suitably-actuated revolving members for effecting the discharge of the treated material, and having, in one of its sides, a discharge-opening whose lower wall's forward portion and whose forward end wall's lower portion have the trend required to form a forwardly and upwardly extending incline $a^4$, and the upper portion of said forward end wall having an inward and upward trend, as at $a^5$, substantially as shown, for the purpose specified.

3. In a machine of the character indicated, the combination with the tank having a discharge-opening $A^4$ at one side and near its bottom, of the suitably-actuated revolving arms or blades $B^2$ extending above and below the lower wall or extremity of said opening and arranged in close proximity to the tank's bottom, substantially as and for the purpose set forth.

4. In a machine of the character indicated, the combination with the tank, an upright shaft arranged centrally of the tank, and any suitable number of laterally-projecting mixing, stirring or disintegrating arms or bars operatively connected with the shaft by means of a groove and feather; of suitable means for elevating said bars or arms out of operative connection with the shaft and holding them in their elevated position, substantially as set forth.

5. In a machine of the character indicated, the combination with the tank, of an upright shaft arranged centrally of the tank, any suitable number of laterally-projecting mixing, stirring or disintegrating arms or bars operatively connected with the shaft by means of a groove and feather, eyes upon said bars or arms, nuts rigid with the top of the tank, suitably-operated screws engaging said nuts and extending into the tank, and provided, at their lower ends, with laterally-projecting arms or members $E^2$, all arranged and operating, substantially as and for the purpose set forth.

In testimony whereof I sign this specification, in the presence of two witnesses, this 25th day of February, 1896.

CHARLES E. ORD.

Witnesses:
 C. H. DORER,
 ELLA E. TILDEN.